United States Patent [19]

Miller et al.

[11] Patent Number: 5,435,814

[45] Date of Patent: Jul. 25, 1995

[54] MOLTEN METAL DECOMPOSITION APPARATUS

[75] Inventors: Charles B. Miller, Ashland; Donald P. Malone, Grayson, both of Ky.

[73] Assignee: Ashland Inc., Ashland, Ky.

[21] Appl. No.: 165,068

[22] Filed: Dec. 10, 1993

Related U.S. Application Data

[63] Continuation of Ser. No. 930,250, Aug. 13, 1992, abandoned.

[51] Int. Cl.$^6$ ............................. C10J 3/48; C10J 3/57
[52] U.S. Cl. ............................. 48/92; 48/61; 48/116
[58] Field of Search ............. 48/92, 111, 77, 206, 48/210, 61; 202/219

[56] References Cited

U.S. PATENT DOCUMENTS

| | | | |
|---|---|---|---|
| Re. 33,905 | 4/1992 | Isozaki | 501/87 |
| 1,803,221 | 4/1931 | Tyrer . | |
| 3,729,297 | 4/1973 | Yoshida et al. | 48/92 |
| 4,062,657 | 12/1977 | Knupprel et al. | 48/92 |
| 4,187,672 | 2/1980 | Rasor | 60/39.12 |
| 4,244,180 | 1/1981 | Rasor | 60/39.04 |
| 4,412,914 | 11/1983 | Hettinger | 208/253 |
| 4,422,872 | 12/1983 | Geskin | 75/51 |
| 4,450,241 | 5/1984 | Hettinger | 502/34 |
| 4,496,369 | 1/1985 | Torneman | 48/92 |
| 4,559,062 | 12/1985 | Hiraoka et al. | 48/92 |
| 4,574,714 | 3/1986 | Bach et al. | 110/346 |
| 4,602,574 | 7/1986 | Bach et al. | 110/346 |
| 4,681,599 | 7/1987 | Obkircher | 48/92 |
| 4,743,341 | 5/1988 | Hladum | 48/92 |
| 4,750,716 | 6/1988 | Reeve-Parker | 266/225 |
| 4,869,879 | 9/1989 | Hettinger | 422/144 |
| 4,915,820 | 4/1990 | Hettinger | 208/253 |

FOREIGN PATENT DOCUMENTS

| | | | |
|---|---|---|---|
| 2552443 | 3/1985 | France | C10K 3/06 |
| 2248292 | 4/1973 | Germany | C10G 9/34 |
| 2443790 | 3/1975 | Germany | 48/206 |
| 2521080 | 11/1975 | Germany | C10J 3/08 |
| 2620462 | 11/1977 | Germany | C10J 3/20 |
| 666119 | 2/1952 | United Kingdom . | |
| 2189504 | 10/1987 | United Kingdom | 48/92 |

OTHER PUBLICATIONS

Gas Process Handbook '92, "Syngas (Partial Oxidation); Syngas (steam reforming)", Hydrocarbon Processing, Apr. 1992, p. 140.

*Primary Examiner*—Peter Kratz
*Attorney, Agent, or Firm*—Richard C. Willson, Jr.; Donald E. Zinn

[57] ABSTRACT

In an improved molten metal hydrogen generation bath, baffles form a draft tube or chimney-effect near the center of the bath. Flow through the chimney is aided by maintaining a temperature differential favoring convection and, optionally, a differential pressure between the portions of the bath on either side of the baffle-chimney arrangement. Feed is added to the feed zone and oxygen is added to the oxidation zone, emitting $H_2$ from the feed zone and CO from the oxidation zone. Baffles may be made simply of brick work or high temperature metal and can fit into existing refractory-lined molten metal vessels. Products can be mixed as syngas feed for Fischer-Tropsch synthesis. Additionally, the Boudouard endothermic reaction ($CO_2 + C \rightarrow 2CO$) can be used to control temperatures by injecting CO in place of oxygen.

5 Claims, 3 Drawing Sheets

MOLTEN METAL DECOMPOSITION APPARATUS

CROSS REFERENCE TO RELATED APPLICATIONS

This application is a continuation of application Ser. No. 07/930,250, filed Aug. 13, 1992, now abandoned.

U.S. patent application Ser. No. 542,234, filed Jun. 21, 1990, now abandoned; Ser. No. 625,350, filed Dec. 11, 1990, now abandoned; Ser. No. 838,642, filed Feb. 20, 1992; and Ser. No. 763,097, filed Sep. 20, 1991, now abandoned; all relate to the general field of the present invention.

BACKGROUND OF THE INVENTION

1. Field of the Invention

The present invention relates to the general field of molten baths for the disassociation of material containing carbon, and preferably hydrogen as well, generally classified in U.S. Patent Office, Class/Subclass: 60/39.12, 48/195, and 23/230A.

2. Description of the Prior Art

U.S. Pat. No. 4,187,672 and U.S. Pat. No. 4,244,180 to Rasor feed a mass of carbonaceous fuel; e.g., coal, into a high temperature liquid; e.g., molten iron, at a temperature high enough to carbonize the feed; e.g., near 2850° F. (1565° C.) and introduces air or other oxygen source into the reactor to react with carbon dissolved in the liquid and uses the hot fuel gas to produce useful energy.

WO 9Z/01492 to Nagel teaches two immiscible zones (layers) of different molten metal temperatures.

Mayes U.S. Pat. No. 4,338,096 teaches methods for controlling the flow of molten-mass reaction medium into a reaction zone by utilizing a gas-lift effect on the molten medium and apportioning the flow of control gas to the desired flow of molten medium. Mayes does not suggest movement of liquid from one zone to another by means of convection.

Bach U.S. Pat. No. 4,574,714, and U.S. Pat. No. 4,602,574 do not suggest the plural zones of the present invention with organic feed introduced into one zone and oxidizer introduced into a second zone, and with the vapor phases and liquid phases of the two zones being separated by barriers as in the present invention.

Tyrer U.S. Pat. No. 1,803,221 teaches production of hydrogen from methane in a two-zone unit, but provides no means for flow by convection between the two zones and does not suggest the specialized baffle separators of the present invention.

Axelsson U.S. Pat. No. 4,511,372 does his whole process in a single vessel at high pressure, primarily to suppress dust.

SUMMARY OF THE INVENTION

1. General Statement of the Invention

Referring to FIG. 1, according to the invention, a vessel having top and bottom walls, a feed zone and an oxidizing zone and containing a molten bath to levels 116, 118 respectively for the decomposition of carbon- (and preferably hydrogen-) containing materials is improved by providing upwardly extending submerged baffle means 114 above the bottom wall abutting the feed zone and defining one wall of a recycle zone (chimney) 108 communicating between liquid in the oxidizing zone and in the feed zone. The invention also comprises horizontal extending baffle means 115, above the bottom wall. The horizontally extending submerged baffle means 115 is integral with a lower portion of the upwardly extending baffle means 114 and arranged so as to define the lower end of a generally L-shaped recycle zone 108, much as a hearth is arranged beneath a chimney. The invention further comprises vapor zone separator or baffle means 112. The vapor zone separator means separates the vapor space above the liquid baths so that the vapor space of the feed zone is separated from the vapor space of the oxidizing zone. This vapor zone separator means 112 abuts the oxidizing zone and extends downward into the liquid of the oxidizing zone to define the other wall of said chimney of the recycle zone 108, but not sufficiently far so as to contact the horizontal extending baffle means 115.

Apparatus

Closed vessel 100: The vessel includes a top wall 100A and a bottom wall 100B and is preferably lined with brick or castable refractories and may be pre-stressed to maintain the refractories in compression even when the vessel is pressurized and hot.

Upwardly extending baffle means 114 and horizontal extending baffle means 115 can be made of refractory materials or even of tungsten, tantalum, or other high-melting refractory metal which may be coated with refractory ceramics.

Vapor zone separator means 112 will preferably be of the same material as upwardly extending baffle means 114, and will preferably be hermetically attached to the top wall of closed vessel 100.

Oxidizer feed means 107 can be any suitable, tuyere design, well-known in the steel-making industry.

Feed inlet 105 can operate by gravity or pump (high pressure pump if the vessel operates under pressure).

Fischer-Tropsch Synthesis

The preferred CO and $H_2$ products are useful for the conventional Fischer-Tropsch synthesis taught e.g., in Chemical Process Industries by R. Norris Schreve, McGraw-Hill, 1967, p. 775.

Boudouard Reaction

This reaction, discussed in U.S. Pat. No. 4,412,914, 4,450,241, 4,869,879, and 4,915,820 all to W. P. Hettinger et al, reacts injected $CO_2$ with carbon in the molten metal to form 2CO and cool the melt as desired.

Metal

While iron is most preferred for specialized applications, copper, zinc, especially chromium, manganese, or nickel, or other meltable metal in which carbon is somewhat soluble, may be used alone or in mixture.

Feed Materials

Natural gas ($CH_4$), liquified petroleum gas (LPG), propane, petroleum naphtha, light or heavy distillate, vacuum and other resids, solvent de-asphalted pitch (SDA), aromatic extracts, FCC slurry oil; trash garbage, tires, coal and virtually any other hydrocarbon-containing material.

Products

Products are CO, $CO_2$, $H_2$ plus sulfur and other contaminants in feed which may be outputted in slag which can be periodically drained off. In refineries, sulfur is preferably outputted as gas in the hydrogen stream and is then treated conventionally by the Claus process and the SCOT (Shell Claus Offgas Treatment) unit.

Controls

Conventional analog or digital controls are used, measuring temperature, preferably with optical or infrared pyrometer or protected thermocouple; carbon by spectrometer; level by nuclear radiation and admitting feed, $CH_3$, $CO_2$, $H_2O$ to maintain temperature, which must, of course, be high enough (e.g., at least 1,250° C. in feed zone, 1,300° C. in oxidizing zone) to maintain the particular metal carbon composition liquid and dissolved carbon level and $H_2$ production within preset limits. Temperature is preferably 1,150° to 1,600°, more preferably 1,250° to 1,500°, and most preferably 1,300° to 1,450° C. in the feed zone, and usually preferably 50° to 150° C. higher in the oxidation zone.

Batch/Continuous Operation

While the Examples describe the invention on a continuous basis, it may, of course, be practiced on a batch or semi-batch basis with discontinuous flows of starting materials into the molten-metal vessel and with intermittent withdrawal of slag and/or product gases.

Flexibility

Wide ranges of feed rate, feed composition, and contaminants can be accommodated, even wide swings over short time intervals.

2. Utility of the Invention

The present invention is useful for the production of a wide variety of end-products, including all those which can be produced by the well-known Fischer-Tropsch process, e.g., naphthas, diesel fuel, jet fuel (kerosene), as particularly commercialized by Sasol in South Africa. The Mobil Oil "M-Gas" process (U.S. Pat. No. 3,998,899, etc.) may be employed. At the present time, the invention will be particularly valuable for the flexible production of reformulated fuels as mandated or as desirable for protection of the environment, e.g., methanol, methyl tertbutyl ether (MTBE) and tert amyl ether (TAME), etc. In its preferred embodiments, the invention functions entirely from distress or low-valued hydrocarbons, air (for oxidation), and water (to supply hydrogen and additional oxygen). It is particularly noteworthy that the invention can utilize the exothermic carbon oxidation reaction so that it can function without need for external energy input. Additionally, the endothermic Boudouard reaction ($CO_2 + C \rightarrow 2CO$) can be used to control temperature within the two reaction zones, and particularly to control the differentials so as to adjust convection circulation of materials between the zones as desired.

Syngas uses, per Kirk-Othmer, $CO/H_2$ without any other reactants as building blocks, e.g., glycol synthesis, modified Fischer-Tropsch syntheses to olefins or waxes, and acetic acid synthesis; those involving $CO/H_2$ and employed to make additional use of compounds derived from synthesis gas, e.g., homologation of methanol to ethanol; those that use a deravative based on $CO/H_2$, e.g., methanol, as a starting material for a further reaction sequence, e.g., Mobil's MTG (methanol to gasoline) process or the vinyl acetate process; and energy-efficient processes, e.g., those that make syngas for use in combined-cycle plants; and those that use the carbon monoxide for subsequent syntheses, e.g., of acetic anhydride, acrylates, Koch acids, etc.

DESCRIPTION OF THE PREFERRED EMBODIMENTS

Figure 1:
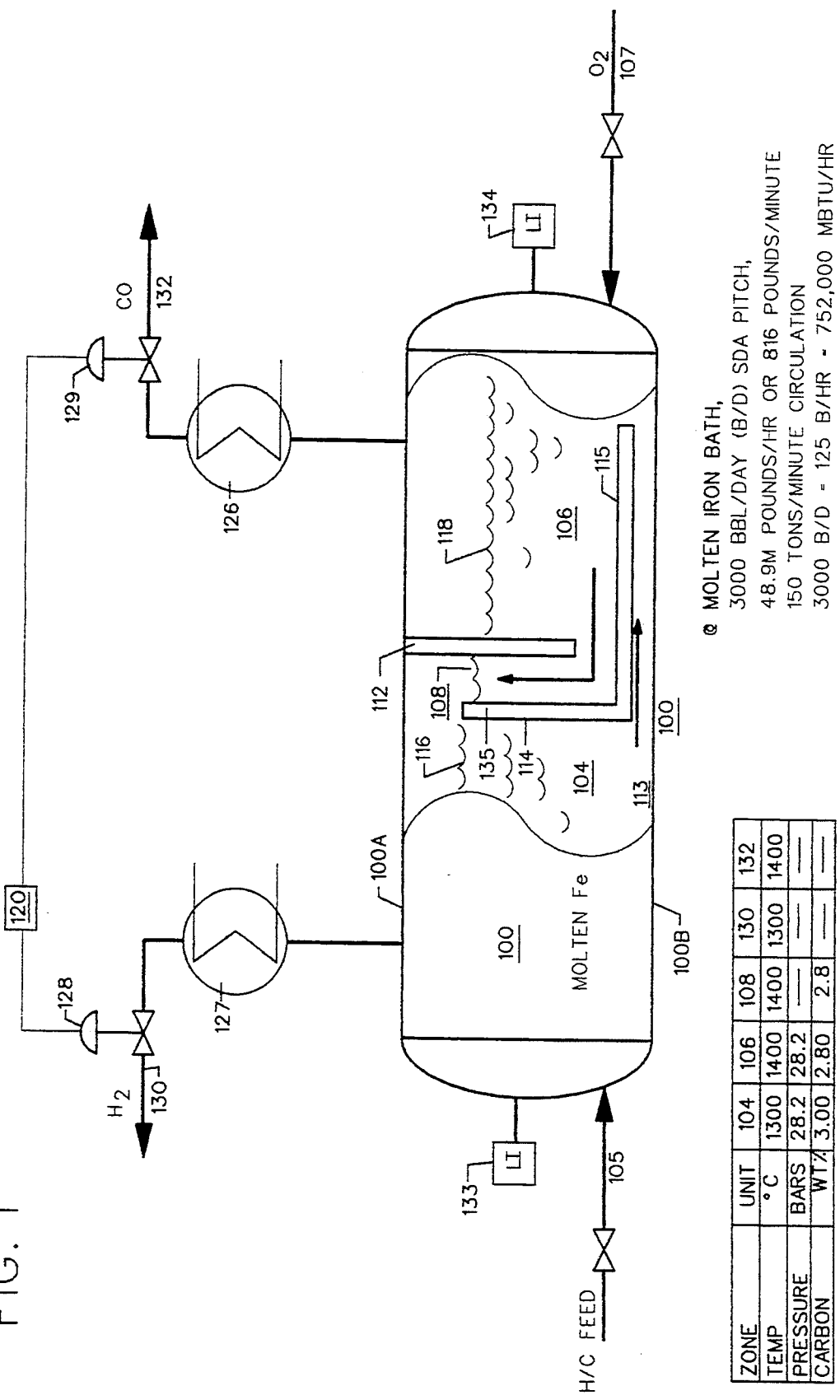
FIG. 1 is a schematic diagram of a section view of the closed vessel 100 showing the feed zone 104 and the oxidizing zone 106 separated by the chimney/hearth-like recycle zone 108 defined by upwardly extending baffle means 114/horizontal extending baffle means 115 and vapor zone separator means 112, along with the vessel 100.

Referring to FIG. 1, the main vessel (a refractory-lined steel vessel 100) encloses and partially defines feed zone 104, oxidizing zone 106, lower circulation zone 113, and L-shaped recycle zone 108. Feed zone 104 receives feed through feed inlet 105. Oxygen enters through oxidizer feed means 107 into oxidizing zone 106. Oxidizing zone 106 and recycle zone 108 are controlled by pressure control means 120 which acts on control valve 128 and control valve 129 to throttle H2 outlet 130 and CO outlet 132 differentially as desired. Cooler 127 and cooler 126 protect control valve 128 and control valve 129 by cooling the products. Level controllers 133 and level controller 134 control the level in the feed and in the oxidizing zone, respectively, and feed signals to pressure control means 120 to maintain those levels.

Figure 2:
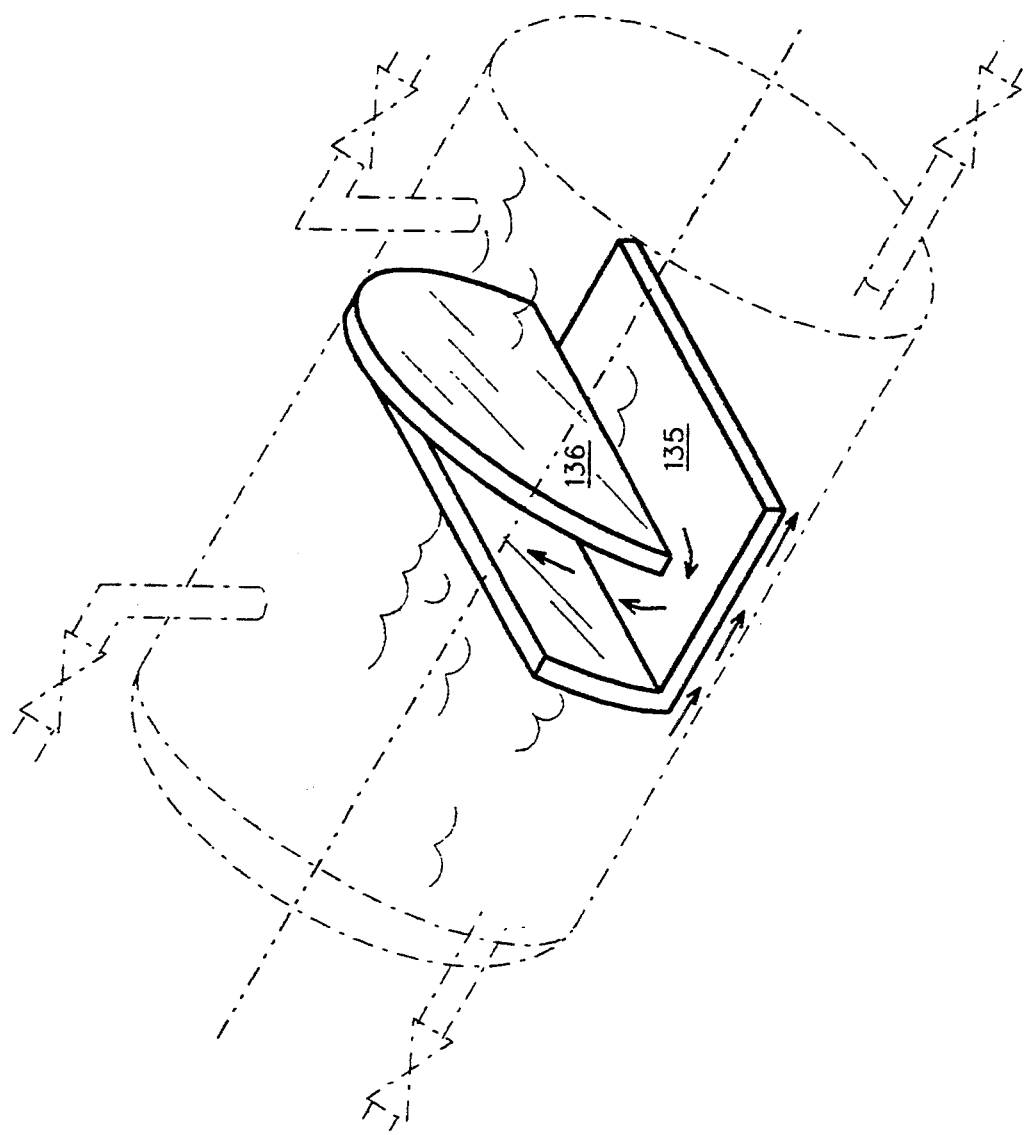
FIG. 2 is a detail of FIG. 1 showing the baffles 135 and 136.

FIG. 2 is a detail of the baffles. Baffle 135 and baffle 136 are shown in more detail in FIG. 2. Note that baffle 135 has both a horizontal and a vertical projection, whereas baffle 136 is primarily vertical in its projection and is sealed hermetically to the edges of refractory-lined steel vessel 100 to effectively separate the gas spaces above the feed zone and the oxidizing zone. Together, baffle 135 and baffle 136 define lower circulation zone 113, recycle zone 108, and additionally separate the two gas phases as mentioned above. The recycle zone 108 is particularly formed by a hearth-like substantially horizontal projection of baffle 135 and the vertical upward projection of baffle 135 acts with baffle 136 to form a chimney-like vertical section to the recycle zone 108. This configuration is an important feature of the invention because it provides the necessary circulation which moves the carbon first through lower circulation zone 113 from the feed zone to the oxidizing zone 106 after feed zone 104, thence through recycle zone 108 after the carbon has been largely removed in the oxidizing zone closed vessel 100.

In operation, the apparatus of FIG. 1 has a temperature of approximately 1300° C. in feed zone 104, 1400° C. in oxidizing zone 106, and emits hydrogen and CO at approximately those temperatures, respectively. Pressure within closed vessel 100 is preferably from 0 to 50 bars, more preferably from 0.1 to 40 bars, and most preferably from 1 to 25 bars above atmospheric, though higher pressures, even as high as 100 bars can be utilized with special construction if desired for special circumstances.

Feed zone 104, preferably contains about 0 to 4.3%, more preferably about 1 to 4%, and most preferably 3% carbon. The carbon content in oxidizing zone 106; is an amount less than in feed zone 104 determined by the circulation rate of the molten metal and the feed rate of carbon to the feed zone. The vessel is a conventional refractory-lined design of steel suitable for the temperature and other surface conditions. The oxygen source is preferably 99.9% oxygen distilled from an oxygen plant operating on air (not shown) but may be air where the additional nitrogen is tolerable. Various feeds are described under the following examples.

EXAMPLES

Example I

Invention Operating on Solvent De-asphalted Bottoms (SDA)

The feed rate is 22.3 tonnes/hour of SDA bottoms. The molten iron circulation is 9,000 tonnes/hour through recycle zone 108 and 1.75 tonnes/hour of hydrogen are emitted through H₂ outlet 130 and 43.8 tonnes/hour of CO are emitted through CO outlet 132. The results for this and other Examples are shown in Table A.

Example II

Invention with Methane Heat Balance

The procedure of Example I is followed except that methane is added to the feed for heat balance. The ratio of hydrogen to carbon monoxide in the product gas is approximately 1:1 on a molar basis.

Example III

Invention With Steam Heat Balance

The procedure of Example I is followed, except that steam is added to the feed for heat balance. The ratio of hydrogen to carbon monoxide in the product gas is approximately 1:1 on a molar basis.

Example IV

Invention With Carbon Dioxide Heat Balance

The procedure of Example I is followed, except that carbon dioxide is added to the feed for heat balance. The ratio of hydrogen to carbon monoxide in the product gas is approximately 1:3 on a molar basis.

Example V

Coal Feed to Invention

The procedures of Example I are followed except that the feed is coal and the approximate molar ratio of carbon monoxide to hydrogen is 3:1 and except that 44,000 pounds/hour (20,000 Kg/hour) of steam are injected through oxidizer feed means 107 along with 22,500 pounds/hour of oxygen.

Example VI

Trash Fed to Invention

The procedures of Example I are followed except that the feed is mixed non-metallic trash (largely waste paper) and garbage (largely organic food residue), which is dried by using heat from the process, and the molar ratio of carbon monoxide to hydrogen is approximately 1:1.

Example VII

Methylene Chloride Disposal and Other Chlorinated Organics

The procedure of Example I is followed except that the feed is methylene chloride, which has been contaminated and has no commercial value but represents a substantial disposal problem. Carbon monoxide and hydrogen are produced in a molar ratio of approximately 1:1.5. To neutralize the chlorine and avoid toxic emissions, 2 pounds of slaked lime CaO per pound of methylene chloride is added near the top surface of feed zone liquid level 116 and oxidizing zone liquid level 118, and 2.5 pounds of slag per pound of methylene chloride is permitted to flow outward through an outlet (not shown) which skims the surface of feed zone liquid level 116 and oxidizing zone liquid level 118. The slag comprises largely $CaCl_2$.

Example VIII

Invention with Fischer-Tropsch Synthesis

Figure 3:
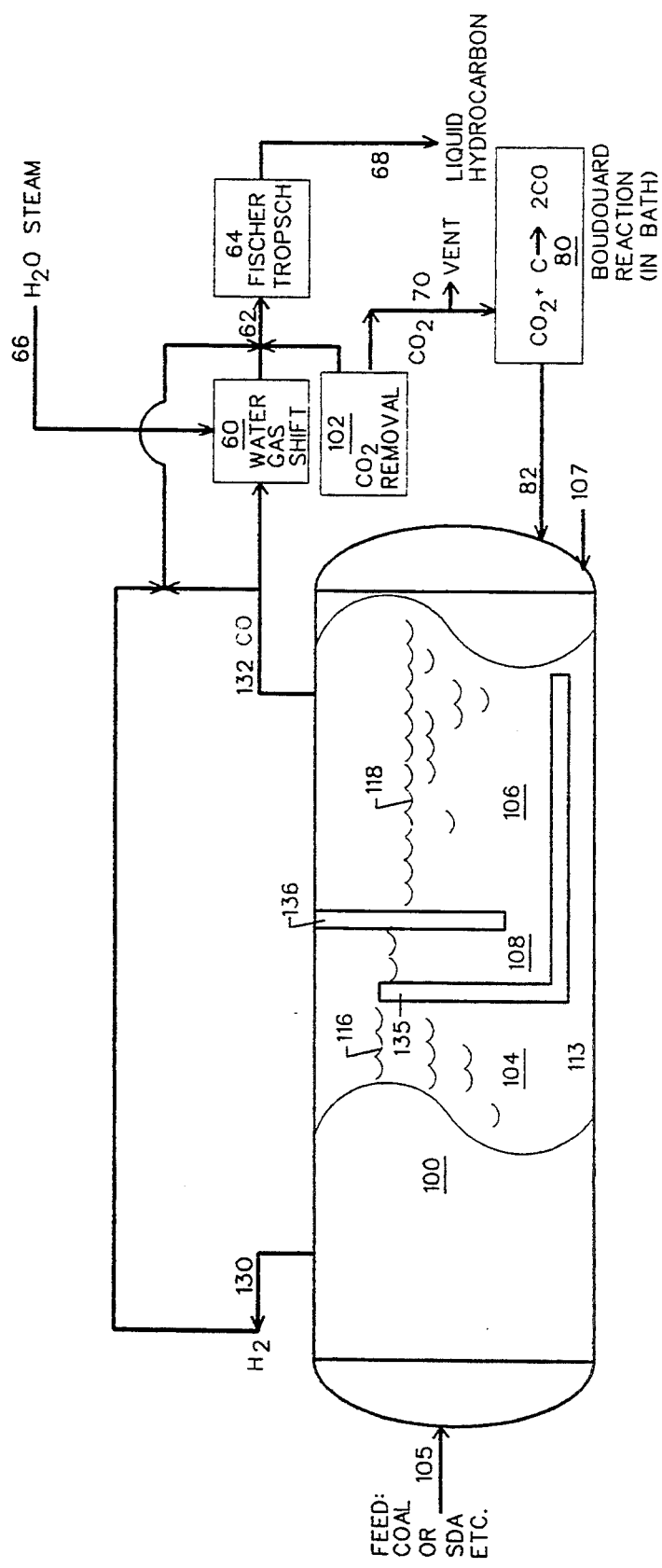
FIG. 3 is a schematic diagram showing the optional water-gas shift reactor 60, Fisher-Tropsch reactor 64, the optional Boudouard reactor 80 which occurs in the molten bath oxidizing zone 106, and the removal of carbon dioxide by means of the Benfield or Pressure Swing Absorption processes.

As shown in FIG. 3, Example I is continued and some of the carbon monoxide produced is mixed with steam 66 reacted to produce $CO_2+H_2$ in water-gas shift reactor 60. The carbon dioxide is separated from hydrogen in $CO_2$ removal closed vessel 102. This hydrogen and hydrogen from H₂ outlet 130 are mixed with the remaining CO. Then the syngas 62 is reacted in Fisher-Tropsch reactor 64 to produce Fisher-Tropsch liquids 68. The Fischer-Tropsch liquids comprise naphtha, kerosene, and diesel fuel. By varying conditions of the Fischer-Tropsch process according to well-known techniques, the product distribution may be varied to favor naphtha or diesel, at will.

Example IX

Invention with Fischer-Tropsch and Boudouard

When the process of Example VI is repeated, the $CO_2$ by-product from water-gas shift reactor 60 is fed to zone 106; it reacts with carbon dissolved in the molten metal to form two moles of CO for each mole of $CO_2$ fed to zone 106.

MODIFICATIONS

Specific compositions, methods, or embodiments discussed are intended to be only illustrative of the invention disclosed by this specification. Variations of these compositions, methods, or embodiments are readily apparent to a person of skill in the art based upon the teachings of this specification and are therefore intended to be included as part of the inventions disclosed herein.

Reference made above to any other specification or literature is intended to result in such patents or literature being expressly incorporated herein by reference.

TABLE A

| | | (Tonnes/Hour) | | | | |
|---|---|---|---|---|---|---|
| Example | Feed, 105 | Oxygen, 107 | H₂, 130 | CO, 132 | Molten Metal Circulation, 108 | Methanol by F-T Prod |
| I | SDA 22.3 | 25.0 | 1.75 | 43.8 | 9,000 | 25.9 |
| II | Methane *24.2 | 50 | 6.4 | 87.5 | 18,000 | 67.3 |
| III | Steam *16.3 | 10.2 | 3.5 | 43.3 | 9,000 | 35.0 |
| IV | CO₂ *39.8 | 10.6 | 1.75 | 69.1 | 9,000 | 35.6 |

*plus same SDA as in Example I

What is claimed is:

1. A molten metal bath apparatus for decomposing carbon- and hydrogen-containing feed and producing hydrogen, said apparatus comprising: a gas-impermeable vessel having a top wall and a bottom wall, means for feeding said carbon- and hydrogen-containing feed to said vessel, a molten metal bath within a bottom of said vessel, said molten metal bath being spaced from said top wall, means including said vessel for defining a feed zone within said vessel for receiving said feed and dissolving said carbon and an oxidizing zone within said vessel for receiving materials containing oxygen and a gas-phase in each said zone above the level of said molten metal bath and between the molten metal bath and the top wall of said vessel, the improvement wherein said means defining said feed zone and said oxidizing zone further comprises:

a. first baffle means mounted within said vessel separating a gas-phase of said feed zone from a gas-phase of said oxidizing zone, said first baffle means extending substantially gas tight downward from said top wall of said vessel and having a lower edge entering, but not extending through, said molten metal bath, and defining with said vessel said gas-phases of said feed zone and said oxidizing zone;

b. second baffle means mounted within said vessel spaced from said first baffle means and within said bath, having an upward extension including an upper edge at a level higher than said lower edge of said first baffle means and having an integral, horizontal extending baffle means, extending substantially horizontally from a lower end of said upward extension and being of a length so as to extend beyond and below the lower edge of said first baffle means, whereby said integral, horizontal extending baffle means defines with the bottom wall of said gas-impermeable vessel a lower circulation zone for said molten bath from said feed zone to said oxidizing zone, said first baffle means and said upward extension of said second baffle means partially defines said feed zone and said oxidizing zone, said upward extending baffle means and said integral horizontal extending baffle means of said second baffle means and said first baffle means define a generally L-shaped recycling zone, whereby molten material from said feed zone containing carbon from said feed may circulate under said horizontal extending baffle means into said oxidizing zone, and wherein said molten bath from said oxidizing zone, lowered in carbon after contact with oxygen, may flow reversely above the horizontal extending baffle means of the second baffle means beneath the lower edge of the first baffle means and rise upwardly between the upward extension of said second baffle means and said first baffle means and over the upper edge of the second baffle means upward extension in a continuous circulation loop back into said feed zone.

2. An apparatus according to claim 1 further comprising means for providing a higher pressure in the oxidation zone than in said feed zone to promote circulation of said liquid over the upper edge of said second baffle means.

3. An apparatus according to claim 1 wherein said bath comprises iron, and said apparatus comprises means for operating said bath at a temperature of about 1150° to 1600° C. in said feed zone and at a temperature of 50° to 150° C. higher in said oxidation zone.

4. An apparatus according to claim 1 further comprising an inlet means coupled to said vessel for feeding carbon dioxide into the molten metal in the oxidation zone to cool the melt.

5. An apparatus according to claim 1, further comprising means for pressurizing said gas-impermeable vessel in the range from 0.1 to 100 bars above atmospheric.

* * * * *